United States Patent [19]
Gillis

[11] 3,779,294
[45] Dec. 18, 1973

[54] BOARD EDGING MACHINE

[75] Inventor: William Warren Gillis, Burnaby, British Columbia, Canada

[73] Assignee: Mill and Timber Products Ltd., Burnaby, British Columbia, Canada

[22] Filed: Mar. 27, 1972

[21] Appl. No.: 238,054

[52] U.S. Cl. .......... 144/117 B, 144/134 R, 144/137
[51] Int. Cl. .......................... B27c 5/02, B27m 3/08
[58] Field of Search .................. 144/117 B, 117 R, 144/134 R, 137

[56] References Cited
UNITED STATES PATENTS
2,851,070   9/1958   Hughes........................... 144/117 B Primary Examiner—Donald R. Schran
Attorney—Brian J. Wood et al.

[57] ABSTRACT

A board edge trimming machine having a rotating cutter which is mounted for rocking movement on a sliding carriage and controls for independently controlling rocking movement of the cutter and movement of the carriage so as to provide a board with a wavy, variably-bevelled edge.

3 Claims, 5 Drawing Figures 3,779,294

BOARD EDGING MACHINE

BACKGROUND OF THE INVENTION

1. Field of the Invention

This invention relates to machines for edge trimming boards.

2. Prior Art

In consturction of buildings having a rustic appearance it is common practice to use siding boards one edge of which is trimmed to simulate board edge which is a portion of the original outer face of the log from which the board has been cut.

Edging machines of prior art which have been developed for rustic trimming have usually incorporated a rotatable cutter which is moved back and forth of a board edge as the latter is moved lengthwise so as to produce a bevelled wavy edge. There is very little, if any, variation in the bevel angle of the wavy edge throughout the length of the board, the trimmed edge thus having a somewhat artificial look as it does not have irregularities of a board edge which is a portion of the original outer face of the log.

SUMMARY OF THE INVENTION

The present invention provides a machine for edge trimming boards wherein the board edge not only has an irregular wavy outline but also in which the bevel angle of the edge is also irregular throughout the length of the board thus closely simulating untrimmed board edges.

The machine of the present invention has a cutter which is moveable transversely of the board to provide a wavy edge and which also is rockable independently of its transverse movement so that the edge has a variable bevel throughout the length of the board.

The machine of the present invention includes means for moving a board lengthwise, a carriage moveable transversely of direction of movement of the board, a cradle mounted on the carriage for rocking movement, a driven rotatable cutter mounted on the cradle and means for rocking the cradle independently of transverse movements of the carriage.

A detailed description following related to the drawings gives exemplification of preferred embodiment of the invention which, however, is capable of expression in a structure other than that parituclarly described and illustrated.

DETAILED DESCRIPTION

Figure 1:
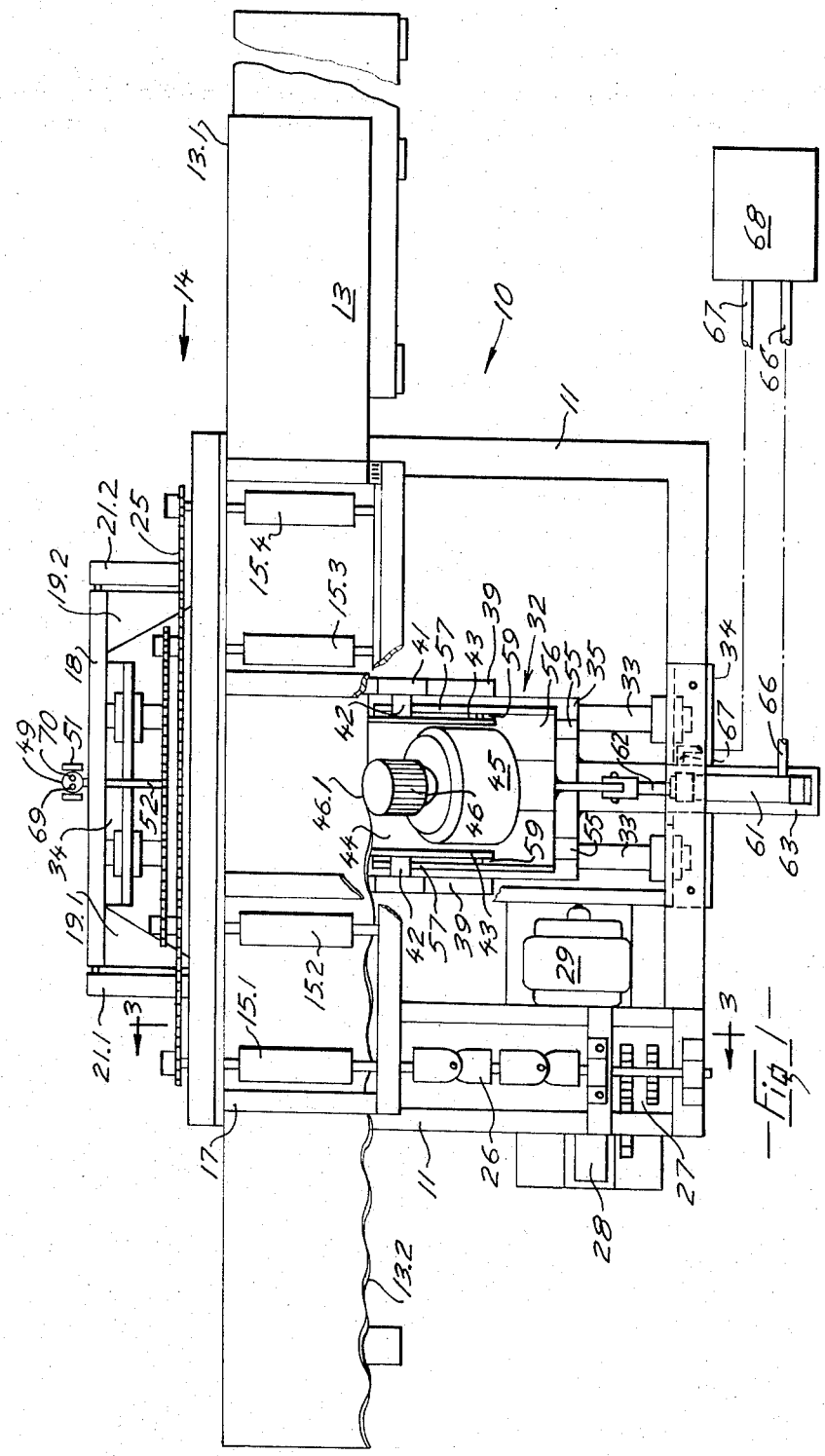
FIG. 1 is a plan view of an edging machine of the present invention.
Figure 2:
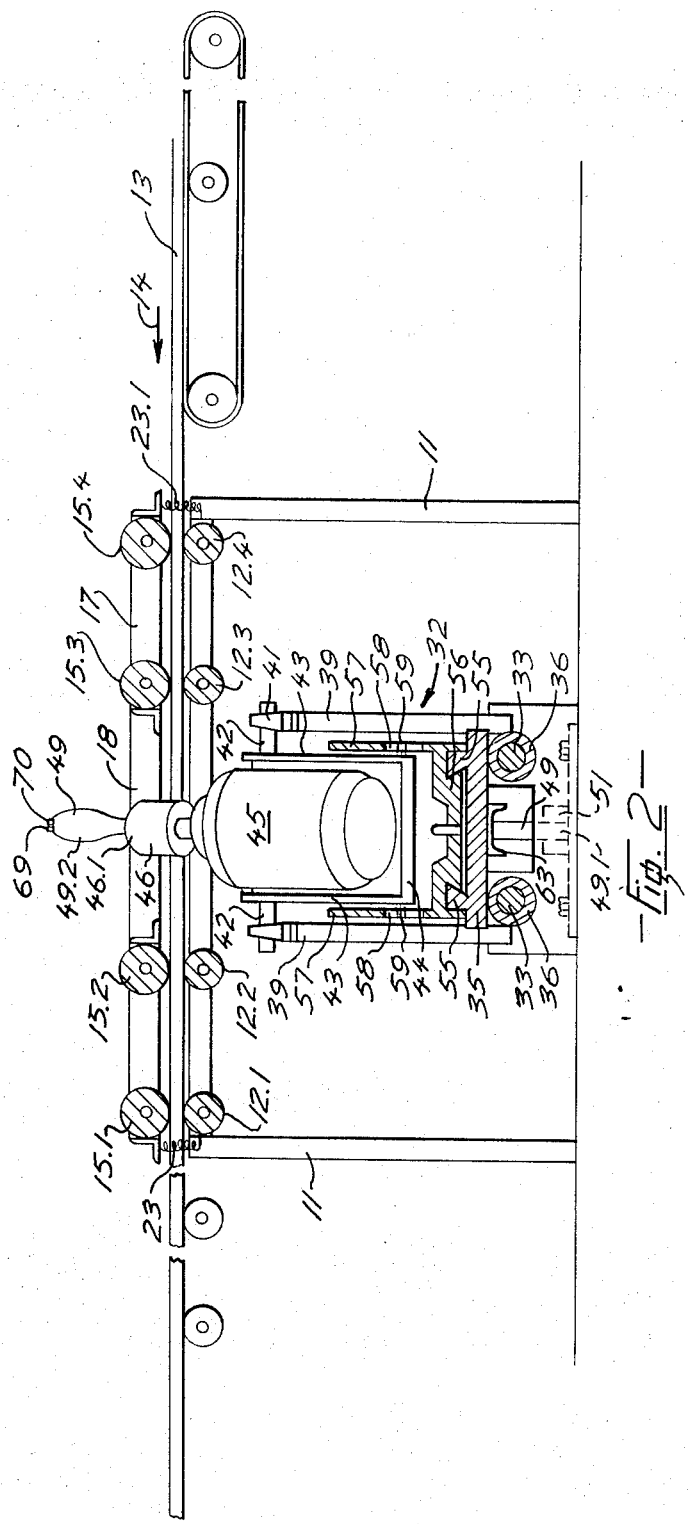
FIG. 2 is a front elevation, partially sectioned, of a portion of the machine.
Figure 4:
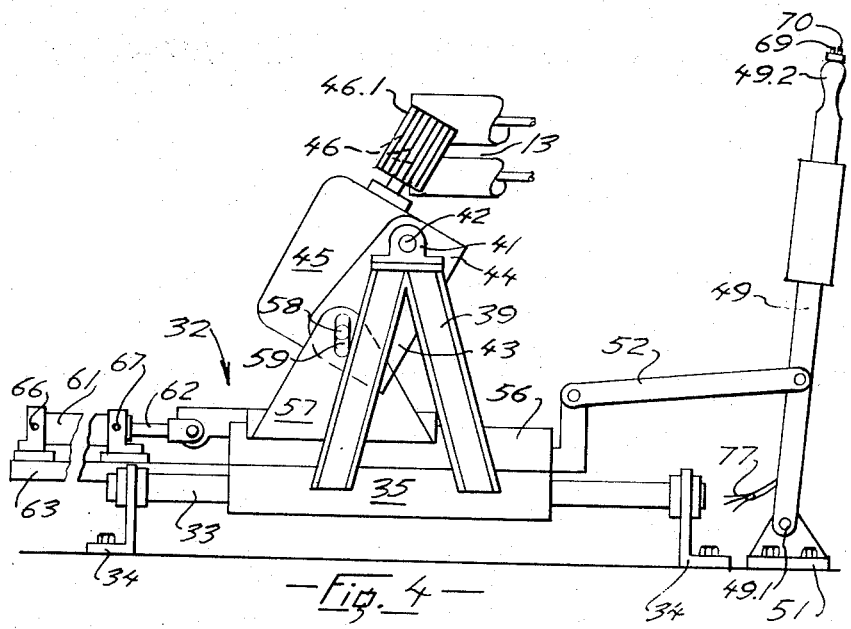
FIG. 4 is a side elevation of a portion of the machine, showing particularly a cutting assembly.
Figure 3:
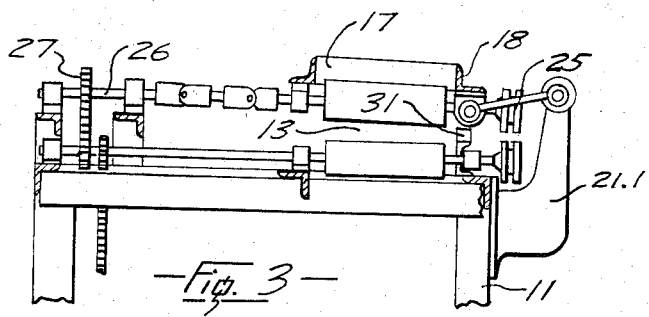
FIG. 3 is a view taken on 3—3 of FIG. 1.

FIGS. 1, 2, and 3

Referring to the drawings an edging machine, generally 10, in accordance with the invention has a main frame 11 in which four supporting rolls 12.1, 12.2, 12.3, and 12.4 are mounted forming a bed for supporting a board 13, to be edged, for lengthwise movement in a direction shown by arrow 14, see FIG. 2.

Four pressure rolls 15.1, 15.2, 15.3, and 15.4 are mounted above the supporting rolls in a swinging frame 17. A side member 18 of the swinging frame is connected by floating links 19.1 and 19.2 to brackets 21.1 and 21.2 mounted on the main frame. Tension springs 23 and 23.1, FIG. 2, extending between the swinging frame and the main frame maintain pressure of the pressure rolls on the board and permit automatic vertical adjustment of the pressure rolls to accommodate boards of various thicknesses and shapes.

The supporting rolls and pressure rolls are all connected for mutual driving engagement by a chain and sprocket drive assembly generally 25.

The pressure roll 15.1 has a flexible drive shaft 26 which has a chain and sprocket drive connection 27 through conventional reduction gearing 28 to an electric motor 29, FIG. 1. Guidance of the board as it is moved by the pressure rolls is provided by a fence 31, FIG. 3, which one edge 13.1 of the board slidably engages.

FIGS. 1 to 4 and 5

The machine 10 includes a cutting assembly generally 32 which is mounted below and between the supporting rolls 12.2 and 12.3.

The cutting assembly has a pair of spaced transverse parallel shafts 33—33 mounted in floor brackets 34—34. A carriage 35 is mounted on the shafts on collars, severally 36, for slidable movement. The carriage has a pair of side frames 39—39 carrying bearings 41—41 which support trunions 42—42 projecting from side walls 43—43 of a cradle 44. The cradle 44 carries an electric motor 45 on which a cutter 46, having longitudinal blades 46.1, is mounted.

Reciprocal movement of the carriage is effected by operation of a lever 49 which is mounted at a lower end 49.1, for hinged movement, in a floor bracket 51. The lever, which has an operating handle 49.2, is connected to the carriage by a push-rod 52.

The carriage 35 has a pair of spaced parallel rails 55—55 on which a sliding platform 56, having spaced side plates 57—57 have vertical slots 58—58 through which pins 59—59, projecting from the side walls 43—43 of the cradle, slidably extend.

A double acting hydraulic cylinder 61 having a piston 62 is mounted on a bracket 63 projecting centrally from the carriage.

Hydraulic fluid is fed to, and bled from, the hydraulic cylinder through fluid conduits 66 and 67, connected to an electrically operated hydraulic power pack 68, FIG. 1. Operation of the power pack is controlled by a pair of push button switches 69 and 70 on the handle of the lever.

FIG. 5

Figure 5:
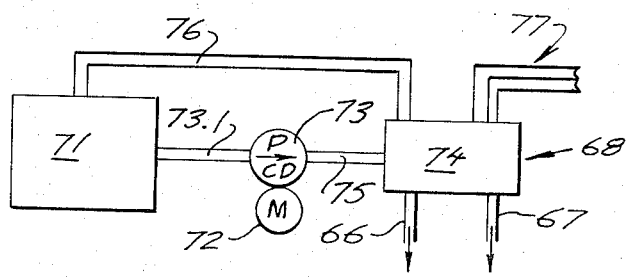
FIG. 5 shows schematically, a power pack for operating the cutting assembly.

Components of the power pack 68, shown schematically in FIG. 5, include a fluid reservoir 71, an electric motor 72 which drives a constant delivery pump 73 having a fluid connection 73.1 to the reservoir. Fluid from the pump is directed to an electrically operated, normally open, three position, four way valve 74 through a fluid conduit 75. The valve which has a return conduit 76 back to the reservoir and a connection to the hydraulic cylinder through the conduits 66 and 67, is electrically connected by leads, generally 77, through the switches 69 and 70 to a suitable power source, not shown.

During operation, with the valve in a normally open position, fluid from the pump passes through the valve directly to the reservoir when switch 69 is closed fluid is directed to one side of the cylinder and bled from the other side. Closure of the switch 70 reverses fluid flow into and out of the cylinder.

Components of the power pack and controls therefore are well known to those skilled in hydraulic mechanisms consequently further description is deemed unnecessary.

OPERATION

In operation of the machine to trim boards an operator watching a board as it is fed through between the rolls moves the carriage, back and forth and with it the cutter, by manipulation of the lever. Movements are random so that operation of the cutter results in an irregular bevelled wavy edge 13.2. At the same time, and independently of back and forth movement of the carriage the operator alternately and irregularly opens and closes the switches 69 and 70 which results in receiprocation of the piston and the sliding platform, and rocking of the cutter so that the bevel angle of the trimmed edge varies irregularly throughout the length of the board. Amplitude of rocking motion of the cutter is usually between about 20° and 40° on either side of the vertical so as to provide noticeable positive and negative bevel angles. The variably bevelled wavy edge thus provided simulates the irregularities of a board edge which is the outer surface of a log from which the board is cut.

I claim:

1. A machine for trimming an edge of a board to produce a variable bevelled wavy edge including:
   a. means for moving a board lengthwise,
   b. a carriage movable transversely of the direction of movement of the board,
   c. a driven rotatable cutter mounted on the carriage for rocking movement towards and away from the board edge,
   d. manually operated means for reciprocally operating the carriage so as to obtain a wavy board edge,
   e. remotely controlled means connected to the cutter for rocking the cutter, and
   f. means for mounting the remotely controlled means on the carriage to permit the cutter to rock independently of the motion of the carriage so that the board trimmed by the cutter has a randomly bevelled wavy edge.

2. A machine as claimed in claim 1 in which the means for moving the carriage includes a lever hinged at one end and having a handle at the other and a push rod connecting the lever and the carriage.

3. A machine for trimming an edge of a board to produce a variable bevelled wavy edge including:
   a. means for moving a board lengthwise,
   b. a carriage movable transversely of the direction of movement of the board,
   c. a driven rotatable cutter mounted on the carriage for rocking movement towards and away from the board edge,
   d. manually operated means for reciprocally operating the carriage so as to obtain a wavy board edge, and
   e. remotely controlled means mounted on the carriage and connected to the cutter for rocking the cutter independently of the reciprocal movement of the carriage so as to obtain a varying random bevel of the wavy edge,
   f. the remotely controlled means for rocking the cutter including:
   a sliding platform mounted on the carriage for sliding movement,
   a double acting hydraulic cylinder mounted on the carriage, the cylinder having a piston connected to the sliding platform,
   an electrically controlled hydraulic power pack having a fluid connection with the cylinder and having control switches on the handle of the lever operable for controlling fluid feed to, and bleeding fluid from the hydraulic cylinder so as to effect control of reciprocal movement of the piston and the sliding platform, and
   means connected to the sliding platform and the cutter for rocking the cutter when the platform is moved by the hydraulic cylinder.

* * * * *